Aug. 11, 1936.   L. W. CHUBB   2,050,276
POSITION FINDING SYSTEM
Filed July 9, 1931   5 Sheets—Sheet 1
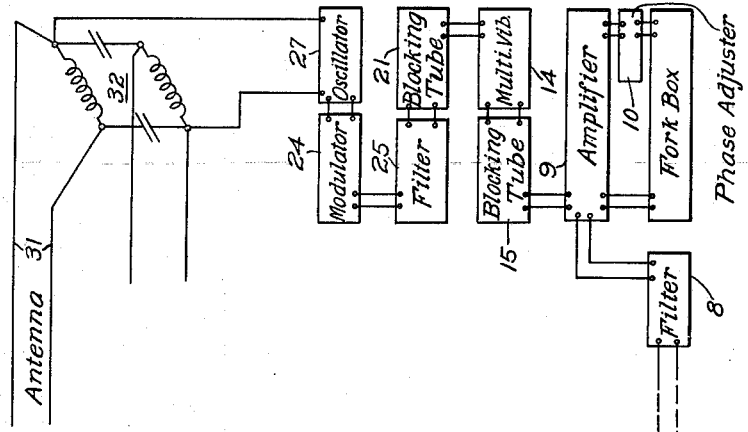
Fig. 1.
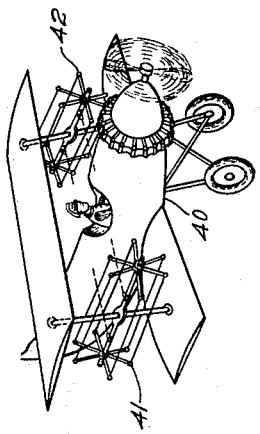
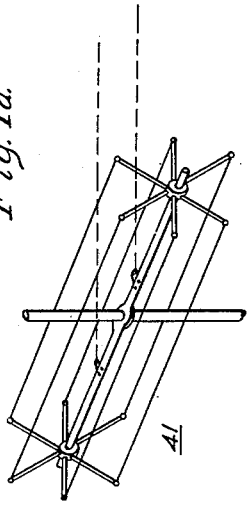
Fig. 1a.
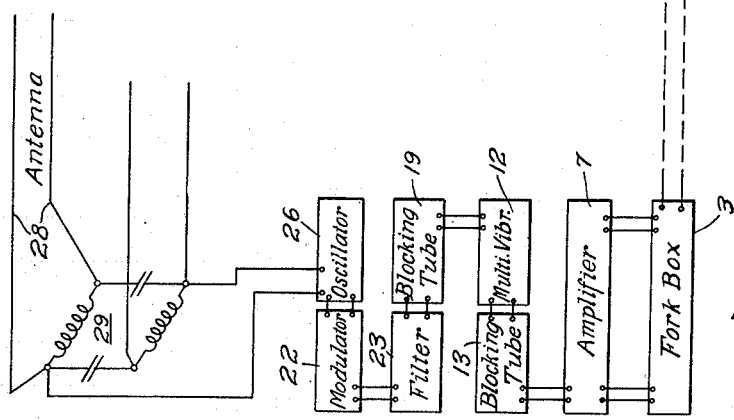
INVENTOR
Lewis W. Chubb.
BY
ATTORNEY

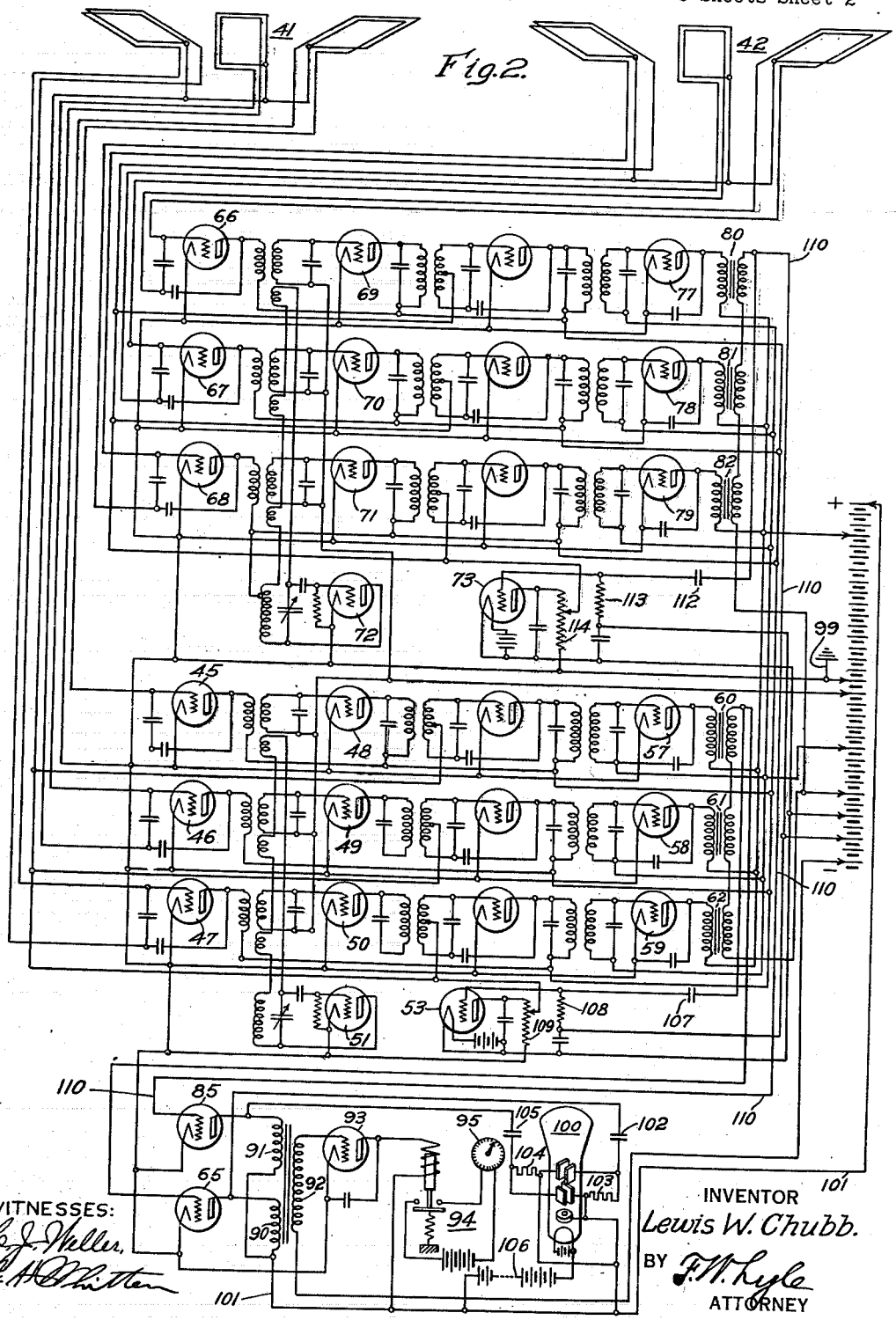

Aug. 11, 1936.          L. W. CHUBB          2,050,276
POSITION FINDING SYSTEM
Filed July 9, 1931          5 Sheets-Sheet 3

INVENTOR
Lewis W. Chubb.

Aug. 11, 1936.                L. W. CHUBB                2,050,276
                         POSITION FINDING SYSTEM
                           Filed July 9, 1931              5 Sheets-Sheet 5

WITNESSES:

INVENTOR
Lewis W. Chubb.
BY
ATTORNEY

Patented Aug. 11, 1936

2,050,276

UNITED STATES PATENT OFFICE 2,050,276

POSITION FINDING SYSTEM

Lewis W. Chubb, Pittsburgh, Pa., assignor to Westinghouse Electric & Manufacturing Company, a corporation of Pennsylvania Application July 9, 1931, Serial No. 549,699

6 Claims. (Cl. 250—11)

My invention relates to position finding and particularly to a radio system by which the occupant of a moving conveyance is enabled to determine its position relative to two or more radio sending stations.

It is an object of my invention to enable, not only the direction of the stationary stations, but their distance from the moving station to be continually indicated at the moving station.

It is a further object of my invention to provide means, associated with two radio stations having relative movement, whereby an indication may be produced at one or both of the stations showing the direction or compass bearing of one from the other, and also showing any changes occurring in their distance apart. This indication may be produced either continuously or at any desired time.

It is a further object of my invention to take advantage of the change in phase relation in radiations received from two distant stations of like frequency which occurs with change in the position of the receiving station.

It is a further object of my invention to measure, by means of the Doppler effect, the rate of relative motion between a receiving and a sending station.

It is a further object of my invention to prevent fading effects from confusing the indication of relative motion between two such stations.

It is a further object of my invention to provide a device which shall show changes in phase relation by visual indications of a fraction of a cycle in addition to a counting means for showing the changes in phase relation which amount to an integral number of cycles.

It is a further object of my invention to enable the pilot of an aeroplane to determine his distances from each of two fixed points at any time during progress away from one of them and toward the other.

It is a further object of my invention to enable the occupant of a moving conveyance to keep informed of the changes in the distance between it and a fixed point so long as the sense of the change in said distance is the same.

It is a further object of my invention to produce a system of standing waves and to measure the distance traveled by a moving receiving device by counting the number of such waves it passes.

In a general way, I accomplish these objects by producing a beat note, the frequency of which is dependent upon the velocity of the motion of one station relative to the other.

Two separate stations are maintained at approximately the same frequency by causing one of them to control the other. One of these is a sending station. The other may be either a second sending station or the oscillator of a heterodyne system at the receiving station.

In the first case, if the two sending stations are stationary, the moving station will, in general, be approaching one and receding from the other. By the Doppler effect, the frequency received from the first is raised and that from the second lowered. The beat note between them will then measure the velocity, and, by counting the beats, I obtain a measure of the distance the moving station has traveled.

In the second case, this difference gives the heterodyne beat note directly.

The general description just given of my way of effecting these objects will suggest many variations thereof to those skilled in the art. Some of the less obvious variations, together with other objects of my invention and details of the structures employed, will be clear from the following description, when read in connection with the accompanying drawings, in which:

Figure 1 is a diagram showing the relation between the sending stations and the receiving station in one embodiment of my invention;

Fig. 1a is a detail showing, in perspective, the mounting of one triple loop.

Fig. 2 is a diagrammatic showing of the circuits and apparatus at the moving station in this embodiment of my invention;

Figure 3:
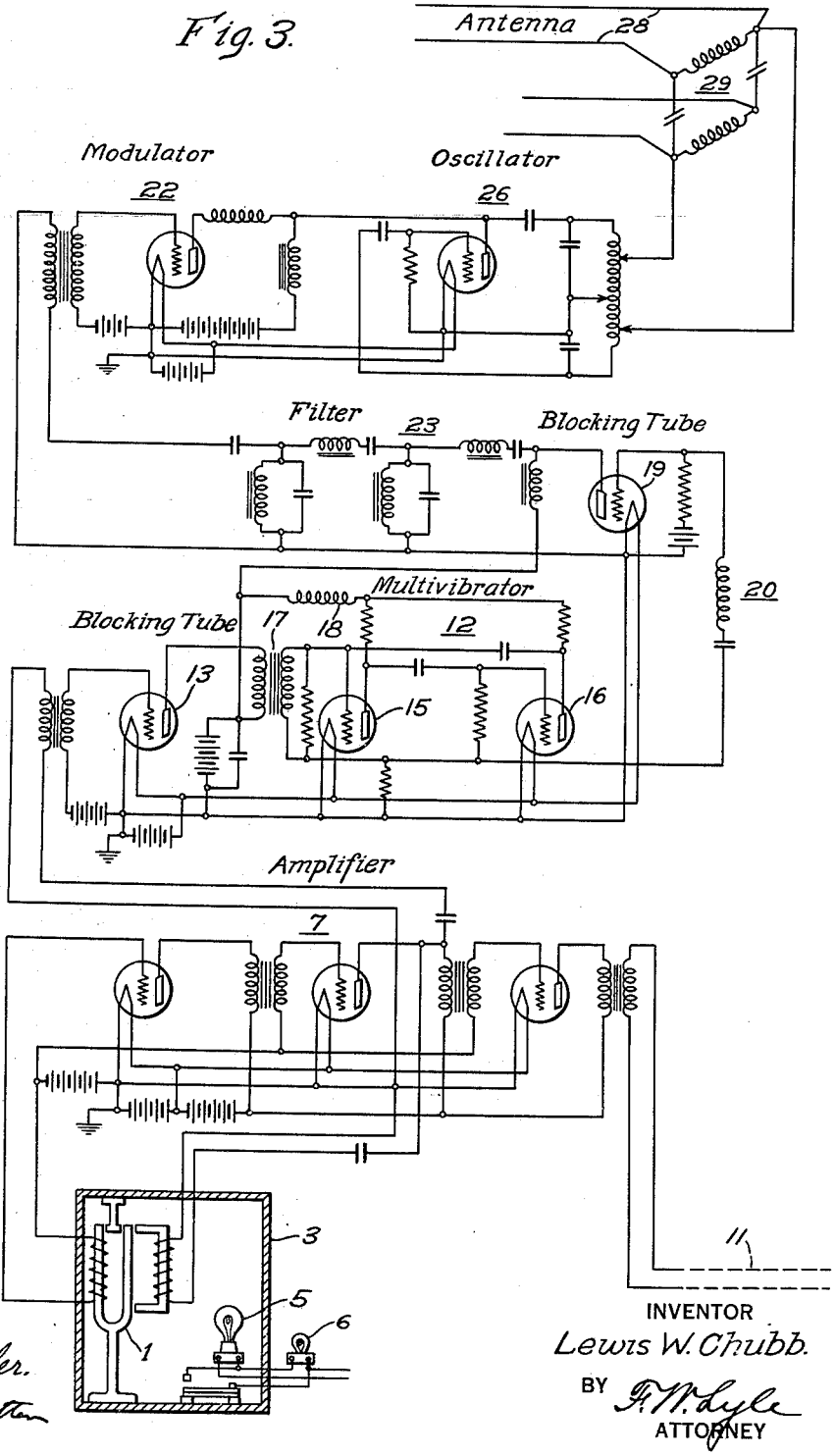
Fig. 3 is a similar diagram for one stationary station.
Figure 4:
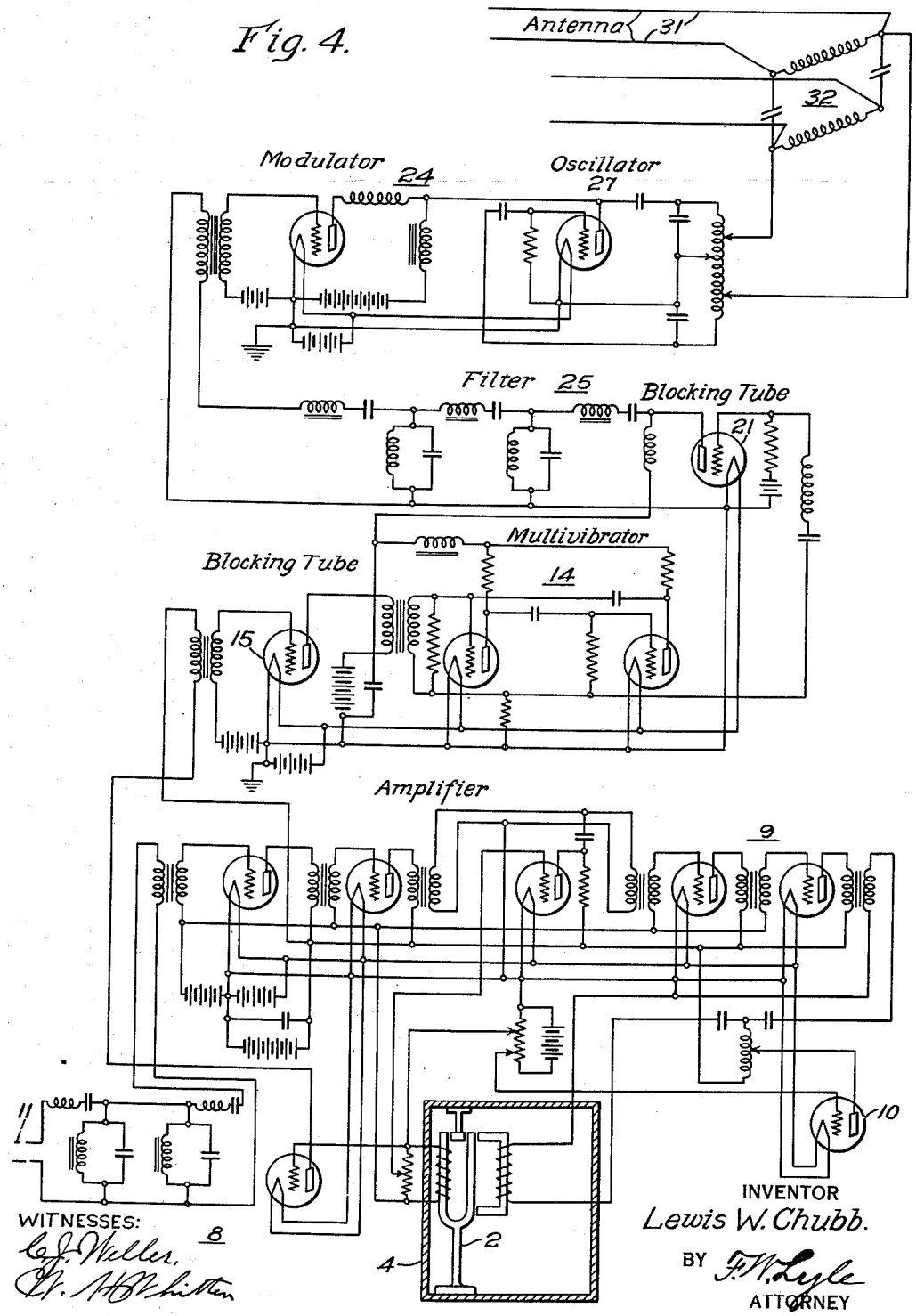
Fig. 4 is a similar diagram for the other stationary station.

The sending station illustrated in Fig. 3 and the sending station illustrated in Fig. 4 are synchronized. In other words, the station shown in Fig. 4 is so constrained that the radiations which it sends out are rigidly of the same frequency as those it receives from the station shown in Fig. 3.

This is accomplished by means of a tuning fork 1, shown in Fig. 3 and a tuning fork 2, shown in Fig. 4. The fork 1 is enclosed in a box 3, for the purpose of maintaining a uniform temperature. Similarly, the fork 2 is enclosed in a box 4. The temperature-control system illustrated by the lamps 5 and 6 in Fig. 3 is omitted from Fig. 4 because the frequency of the fork 2 is regulated by the fork 1. This omission is for the sake of clearer illustration. The lamps 5 may be used at Fig. 4 station, if desired.

The means by which the control of fork 2 from fork 1 is effected includes an amplifier 7 at the first station and a filter 8 at the other station. The amplifier 7 is so connected to the fork 1 as to establish a regenerative system and a similar amplifier 9 (Fig. 4) is part of a regenerative system which includes a phase-adjusting apparatus 10, (Fig. 4). Energy from the regenerative system including the amplifier 7 is delivered to the filter 8 and acts upon the regenerative system at the Fig. 4 station to control the fork 2. The energy may be transmitted over any suitable communication channel, indicated on the drawings by the wire line 11. The forks, amplifier, filter and phase adjuster are connected in a system which is illustrated and described in detail in the copending application of Wolf, filed December 9, 1927, Serial No. 238,823, now Patent 1,781,263 granted November 11, 1930, (assigned to Westinghouse Electric and Manufacturing Company). A more detailed description of this synchronizing system is omitted here because embodied in the said Wolf application.

The amplifier 7 delivers current to the input of a multi-vibrator 12, which current has the frequency of the fork 1. This delivery is made through a blocking tube 13, which prevents any reaction from the multi-vibrator upon the fork. Similarly, the amplifier 9 delivers current to the multi-vibrator 14 having the frequency of the fork 2, this delivery being made through the blocking tube 15.

The multi-vibrators 12 and 14 are described in detail in the application of Ralph N. Harmon, filed August 15, 1929, Serial No. 386,185, now Patent 1,936,789 granted November 28, 1933 (assigned to the Westinghouse Electric and Manufacturing Company).

The multi-vibrator 12 includes a vacuum tube 15 and another tube 16, the plate of each of these tubes being connected, through a condenser, to the grid of the other tube. A high-resistance grid leak is provided for each tube, and the connection to the blocking tube 13 is through a transformer 17, the secondary of which is connected across the grid leak of the tube 15.

The inductor 18 is connected between the junction of the two plate circuits and the supply battery. This supply battery also serves as the plate battery for the tube 19 to which the output of the multi-vibrator is directed. The output connection is through a filter 20 consisting of an inductor and a condenser in series. More elaborate filters may be used if preferred, but, because of the characteristic action resulting from the presence of the inductor 18 in the multi-vibrator, a very simple filter is sufficient.

The multi-vibrator 14, (Fig. 4) is similarly connected to the vacuum tube 21. The details of this multi-vibrator being exactly analogous to the details of the multi-vibrator 12, they are not further described herein. The multi-vibrator 12 delivers to the modulator 22, current of a frequency which is derived from the frequency of the fork 1, being an integral multiple thereof. This delivery is made through the blocking tube 19 and the filter 23. Similarly, the multi-vibrator 14 delivers current to the modulator 24. The frequency of this current is the same integral multiple of the frequency of the fork 2. The delivery is made through the blocking tube 21 and the filter 25.

The modulator 22 is connected to modulate the output of an oscillator 26, and the modulator 24 is connected to modulate the output of an oscillator 27. The oscillator 27 is designed and adjusted to deliver a current of substantially different frequency from that delivered from the oscillator 26. The oscillator 26 is connected to an antenna 28 through the mono-cyclic square 29, which causes the radiation from the antenna 28 to be of the frequency delivered by the oscillator 26, but to be circularly polarized. Similarly, the oscillator 27 is connected to the antenna 31 through the mono-cyclic square 32, whereby the antenna 31 radiates circularly polarized radiation of the frequency delivered by the oscillator 27.

The action of the monocyclic square is explained in my copending application, Serial No. 291,808, filed July 11, 1928, now Patent 1,958,886 granted May 15, 1934 (assigned to the Westinghouse Electric and Manufacturing Company). I have shown the squares here as each connected to two antenna members and the corresponding counterpoises, in order to avoid possible confusion. Although the counterpoises are equivalent to a ground connection for radiation purposes, there is no short-circuiting of one side of each square through the ground.

The moving receiving station is illustrated in Fig. 1 as being carried upon an aeroplane 40. It is equipped with two receiving antennae 41 and 42, each composed of three loops, symmetrically disposed about a horizontal axis. Each antenna has its triple loop mounted for movement as shown in Fig. 1a. The two antennae may thus be made to point accurately toward their sending stations even when the aeroplane is not headed directly toward or away from the station and even when it is not in the line between the two sending stations.

The purpose of the three loops and the way in which they cooperate with the circularly polarized radiation from the sending stations is described in detail in my copending application mentioned above. As explained in said copending application, a single output is produced from the three loops the volume of which is independent of fading and varies only in response to the modulation at the sending station.

Referring particularly to Fig. 2, the three loops comprising the antenna 41 deliver the received signal to three amplifiers 45, 46 and 47, which cooperate with detector tubes 48, 49 and 50 and oscillator 51 to obtain the intermediate frequency of a heterodyne receiving system. The volume of the intermediate frequency is controlled by an automatic volume control including the tube 53, which is connected to operate as explained in the copending application of G. L. Beers, Serial No. 212,791, filed August 13, 1927, now Patent 1,960,723 granted May 29, 1934 (assigned to the Westinghouse Electric and Manufacturing Company), whereby the effects of fading are further eliminated.

The output of the super-heterodyne system associated with the antenna 41 is delivered by the final detector, tubes 57, 58 and 59 and the primaries of three transformers 60, 61 and 62. The secondaries of these transformers are connected in series, and the resultant voltage is delivered to the grid of a summation tube 65.

Similarly, the voltage received on the loops of the antenna 42 is delivered to amplifier tubes 66, 67 and 68, which cooperate with first detector tubes 69, 70, 71 and with an oscillator 72 to produce an intermediate frequency. The volume of this intermediate frequency is controlled by a volume-control including the vacuum tube 73. The final detectors 77, 78, 79 deliver their output to the primaries of transformers 80, 81 and 82, the secondaries of which are connected in series, whereby a resultant potential, varying only with the modulation of the received signal, is delivered to the summation tube 85.

The output of the summation tubes 65 and 85 is delivered to the primaries 90 and 91 of a transformer with a single secondary 92. The output from this transformer after being amplified by tube 93, operates a relay 94 and the counter 95 records the number of operations of said relay.

The output voltage from the summation tube 65 is impressed upon one side of an oscillograph 100, and the output voltage from summation tube 85 is impressed on the opposite side of the oscillograph.

The plate circuits for tubes 65 and 85 are through the respective primaries 90 and 91 of the transformer, over the common connection 101 to the positive end of the main battery and through a portion, ordinarily approximately one half, of this battery to the grounded connection 99 which is common to all of the filaments of the system except that of the oscillograph and those of tubes 53 and 73, which, for reasons explained in the copending application of Beers, are energized by separate batteries.

The connection from the plate of tube 65 to the oscillograph is through a condenser 102, whereby only changes in potential and not the absolute potential of the plate influence the oscillograph. The connection through the condenser 102 is to the right-hand terminal of a resistor 103, and also to the right-hand deflection plate of the upper pair.

The several deflection plates are herein called right-hand and left-hand in accordance with their relative location in Fig. 2. Actually, the two upper plates are at right angles to the two lower plates. The direction from right to left is not the same, therefore, for each pair of plates, but the direction thus named for one pair is at right angles to the direction from right to left for the other pair of plates. The left-hand terminal of the resistor 103, the right-hand member of the lower pair of deflection plates, the left-hand member of the upper pair of deflection plates, the right-hand terminal of the other resistor 104 and the perforated anode are all connected together and are, therefore, at the same potential. The left-hand member of the lower pair of deflection plates and the left-hand terminal of the resistor 104 are connected together and, through the condenser 105, to the plate of the tube 85. The perforated anode and the deflection plate connected thereto are at a strongly positive potential relative to the cathode, this potential difference being supplied by the battery 106.

In the operation of the device, the fork 1 at the Fig. 3 station and the fork 2 at the Fig. 4 station are maintained in exact synchronism, as explained in the copending application of Wolf. The frequency of the current in the regenerative system, including the amplifier 7, is, therefore, exactly like the frequency of the system including the amplifier 9. The control of the fork 2 from the fork 1 necessitates a connection between the two sending stations which is represented by the line 11.

This connection may be, and frequently is, through a radio communication channel instead of over a line. The impulses having the frequency of fork 1 which are received over the line 11, or over the radio communication channel, are impressed, through the filter 8, upon the amplifier 9. The arrangement for impressing these impulses upon the amplifier includes two amplifier tubes which are not portions of the regenerative system. This preliminary amplification may not be needed and, in such case, the output of the filter 8 may be directly impressed upon the amplifier 9.

The output of the amplifier 7 is delivered to the line 11, but, in addition, a portion of the output is delivered to the blocking tube 13 and from tube 13 energy is impressed upon the multivibrator 12 through the transformer 17. The frequency of the current delivered through the transformer 17 is, therefore, the frequency of the fork 1. A multi-vibrator delivers current the frequency of which is an exact integral multiple of that of the current received.

In the older forms of multi-vibrators, many different integral multiples were obtained, and elaborate filters were needed to ensure that the final output should contain only the intended multiple. The addition of the inductor 18 to the circuit of the multi-vibrator makes it possible to accurately control the multiplying factor. Consequently, nearly all of the energy delivered by the multi-vibrator to the tube 19 is of one frequency, a frequency determined by the design of the multi-vibrator.

The filter 20 may, therefore, be a simple filter, and the filter 23 need not be very elaborate. The modulator 22 receives, therefore, a frequency which is a predetermined and definite, integral multiple of the frequency of the fork 1.

For the same reasons, the multi-vibrator 14 delivers, through the blocking tube 21 and the filter 25 to the modulator 24, current of a frequency which is an accurate, integral multiple of the frequency of the fork 2. The multi-vibrator 12 is designed to have the same multiplying factor as the multi-vibrator 14. The frequencies of the modulators 22 and 24 are, therefore, accurately equal.

The oscillator 26 generates a frequency which differs from that of the oscillator 27, but these two different carrier frequencies are modulated at the same modulation frequency. The monocyclic square 29 produces, from the output of the oscillator 26, two currents having a quarter-phase relation in time phase. The antenna 28 is composed of two parts which are arranged in a space relation corresponding to a quarter-phase. The radiation delivered by this antenna is, therefore, composed of two components which are in quarter-phase relation, both as regards time phase and as regards space phase. The result of such a pair of components is circularly polarized radiation. This is explained at further length in my copending application.

As explained in my copending application, the circularly polarized radiation delivered from such an antenna can produce an output in a receiving device independent of fading, provided the receiving device is equipped with an antenna consisting of three loops symmetrically disposed about an axis approximately parallel to the direction of best radiation from the antenna and located approximately in this direction from the sending station.

The three loops constituting the antenna 41 (Figs. 1 and 2) receive radiation from the antenna 28 but are unaffected by radiation from the antenna 31. This is accomplished by tuning the loops of antenna 41 to the frequency of the carrier current generated by the oscillator 26, the tuning being sufficient discrimination against currents of the frequency generated by the oscillator 27 because these frequencies differ widely.

The effect of variations in the phase difference between radiation arriving in a direct line from the sending station and radiation arriving indirectly by reflection is avoided by obtaining the vector sum of the rectified output of the three loops, as was explained in my copending application. This vector addition is accomplished by connecting the secondaries of transformers 60, 61 and 62 in series between one side of the proper portion of the main battery and the grid of the tube 65. The portion of the main battery thus selected is sufficient to impress the necessary negative potential upon the grid of tube 65.

In addition to the fluctuations which may arise from fading of the sort just considered, there may be fluctuations in the actual output of the sending station other than the changes in output intentionally made for modulation. These fluctuations are ordinarily slow, as compared with the modulation, and may be cared for by the device described in the copending application of Beers.

The averaging of the output for this purpose is accomplished by the connection from one terminal of the three secondaries in series, through the condenser 107, to the grid of the tube 53. A discharge path for this condenser is provided over the resistor 108 and a portion of the main battery in series with the three primaries. The resistor 108 and condenser 107 are chosen of such magnitudes that the rate at which the potential of the grid of tube 53 changes in response to changes in the average output is much slower than the rate of potential changes corresponding to the modulation.

These slow changes control the current through resistor 109 in the plate circuit of tube 53 and thus control the potential impressed at the mid-points of the secondaries of the transformers receiving the output from tubes 48, 49 and 50. That is, it controls the grid potential of the amplifiers acting upon the intermediate frequency of the triple super-heterodyne circuit associated with the three loops 41.

The amplifying power of these tubes is altered by the alteration of their grid potential. Any slow tendency to a diminution in the output from the three secondaries connected in series is corrected by an increase in the amplifying action of these amplifiers. The average value of this output is thereby rendered constant, and the only variation in the output is that produced by the modulation of the output from antenna 28, that is, the modulation effected by the modulator 22.

The grid of the tube 65, therefore, receives a potential which varies only with the modulation corresponding to modulator 22. This potential is independent both of fading effects and of variations in the average output from the oscillator 26.

In a similar way, the three loops of the antenna 42 are tuned to the frequency delivered from the antenna 31, that is, the frequency of the oscillator 27. The three vacuum tubes 66, 67 and 68 amplify the three separately received phases of the antenna current, and three detectors 69, 70 and 71 cooperate with an oscillator 72 to produce three intermediate-frequency currents which are amplified by the next tubes and finally detected by the tubes 77, 78 and 79. The output from these three final detectors is vectorially added because the secondaries of transformers 80, 81 and 82 are connected in series. The resultant is impressed, over the wire 110, upon the grid of the tube 85.

The vector addition of the results from the three loops eliminates the effect of fading. The effect of slow variations in the average amplitude of the oscillator 27 is eliminated by the tube 73 with which are associated the condenser 112 and the resistor 113 which correspond to the condenser 107 and the resistor 108 for the tube 53. The output from the tube 73 is over a resistor 114 and controls the grid potential of the three amplifiers between detector tubes 69, 70 and 71 and final detectors 77, 78 and 79.

It will now be apparent that the grids of tubes 65 and 85 vary in potential in accordance with the modulations in the received radiation corresponding to the modulators 22 and 24 and these grids are protected from potential variations arising from any other cause.

As the aeroplane travels away from the antenna 28, there will be a Doppler effect which will cause the currents produced in the antenna 41 to be of somewhat slower frequency than they would be if the aeroplane were stationary.

In any contemplated speed of the aeroplane, the Doppler effect is too small a percentage of the carrier frequency to cause any difficulty in picking up the radiation by the tuned loops. If some diminution of the value of the antenna current should result from this cause, it would be compensated by the tube 53, because changes in the speed of the aeroplane are relatively slow.

The slowing up of the frequency by the Doppler effect is present not only in the carrier frequency but also in the modulations thereof. The potential of the grid of tube 65, therefore, rises and falls somewhat more slowly because of the motion of the aeroplane away from the antenna 28.

In the same way, if the aeroplane be approaching antenna 31, the variations in the potential of the grid of tube 85 will occur somewhat more rapidly than they would if the aeroplane were stationary.

Consider a moment in which the phase relation between the changes in grid potential for the tube 65 and those for the tube 85 is in exact opposition. The action of the primary 90 upon the secondary 92 will then be opposed to the action of the primary 91 on said secondary. If the two outputs are equal, a zero potential will be delivered by the secondary 92, and the grid of the tube 93 will, therefore, remain strongly negative, because of its connection near the negative end of the main battery. The plate current delivered from the tube 93 through the relay 94 will, therefore, be a minimum or actually zero, and the contacts of relay 94 will open.

Consider next a time when the aeroplane has travelled so far from the antenna 28 and toward the antenna 31 that the phase relation between the potential changes on tube 65 and tube 85 is in exact agreement. The effect of primary 90 upon secondary 92 will now be added to the effect of primary 91, with the result that the potential of the grid of tube 93 becomes, at times, sufficiently positive to permit current to flow through relay 94. In response to the average value of the impulses thus flowing in the winding, the relay 94 will close its contacts, and the counter 95 will be stepped forward one point.

As the aeroplane progresses, the two conditions just described will occur alternately and, for each repetition of the occurrences, the counter will be stepped forward one point. The reading of the counter will, therefore, measure the travel of the aeroplane in terms of integral half-wave-length of a frequency corresponding to the modulation frequency.

The momentary potential of the grid of tube 65 fixes the momentary value of the plate potential thereof and thus fixes the potential impressed, through condenser 102, upon the upper right-hand deflecting plate of the oscillator 100. The potential of the left-hand member of the upper pair of deflecting plates is constant because this plate is metallically connected to the anode. The field between the upper pair of deflecting plates, therefore, varies from moment to moment in accordance with the grid potential of the tube 65. In the same way, the field between the lower pair of deflecting plates varies in accordance with the grid potential of tube 85.

The combined action of the two pairs of deflecting plates fixes the momentary position of the end of the cathode ray on the end surface of the oscillograph tube 100. If the phase relation between the two grid potentials for tubes 65 and 85 be exact opposition or exact synchronism, the trace of the cathode ray upon the end of the oscillograph tube will be a straight line. For any other phase relation, the trace will be an ellipse, which, at quarter-phase, will have its maximum width. If the output from tube 65 and that from tube 85 are equal, the trace corresponding to quarter-phase relation will be a circle.

The end of the oscillograph tube is supplied with fluorescent material by means of which the trace can be made visible. By observing the changes in the appearance of the curve shown by the oscillograph, the aeroplane pilot may know, in fractions of a wave length, to what extent his distance from each of the two sending stations has changed. The counter 95 will indicate the integral number of half-wave lengths. By combination of the two, therefore, the observer is able to determine his exact distance.

I have chosen for specific illustration and detailed description that form of my invention in which a large number of refinements are embodied. There are many simpler applications of the fundamental principle, some of which I will now describe.

Figure 5:
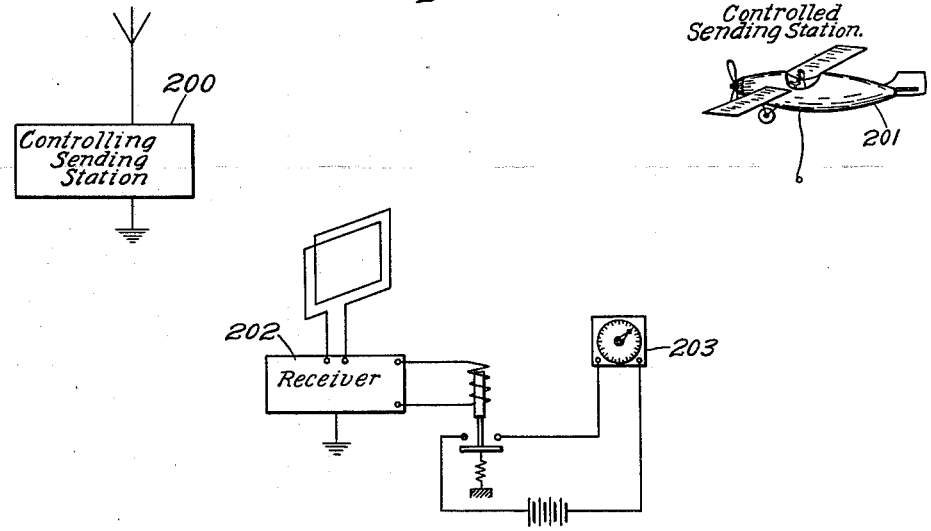
Fig. 5 is a diagram showing the relation between the sending stations and the receiving station in another embodiment of my invention.

In Fig. 5, I have illustrated a stationary sending station 200 which is intended to control the frequency of a moving sending station 201. This control will be effected over a radio-communication channel corresponds to the line connection 11 illustrated in Figs. 1, 3 and 4. The sending station 201 will be equipped with a tuning fork controlled by the fork at the station 200 in the same way in which the fork 2, shown in Fig. 4, is controlled from the fork 1 shown in Fig. 3, except that the connection between the two is by a radio-communication channel.

When the station 201 moves toward the station 200, the impulses received over the communication channel corresponding to the line 11 will be of higher frequency than those delivered by the station 200. This high frequency causes the station 201 to deliver, from its antenna, a higher frequency than it would if the station 201 were not moving toward the station 200. The control of the frequency radiated by station 201 by the fork may be like that illustrated in Fig. 4, or it may be much more simple. The multi-vibrator may be omitted, and the modulator may be omitted, if desired. When this is done, similar omissions are made at station 200.

A stationary receiving station, illustrated at 202, receives radiations from station 200 and from station 201 simultaneously. It, therefore, obtains a beat note because of the movement of station 201 toward station 200. The frequency of this beat note is such that one complete beat occurs for each movement of station 201 toward station 200 through a one-half wave length. A counting device illustrated at 203, may be associated with the receiver to keep count of the movement.

If the station 201 is moving away from the station 200, a beat note will be produced at station 202 which will be counted in the same way. It is necessary to resort to the readings of a radio compass, or some similar expedient, to know at station 202 in which direction the station 201 is moving.

If the modulators are omitted, the wave lengths counted by the apparatus 203 are of the carrier frequency. If a modulator is used, the counting device will measure the movement in terms of wave lengths of the modulation frequency.

One useful variation of this system is produced by placing station 202 near station 200. When this is done, the loop at 202 is so set that it is nearly insensitive to the near-by signals from station 200 and of maximum sensitivity for the signals from station 201. For this purpose, the plane of the loop at 202 is nearly normal to the direction from station 202 to station 200 and nearly parallel to the direction from station 202 to station 201.

Obviously, the two stations near each other may be on the vehicle, and the fixed stations may consist of a controlled sending station, thus reversing the arrangement illustrated in Fig. 5.

Figure 6:
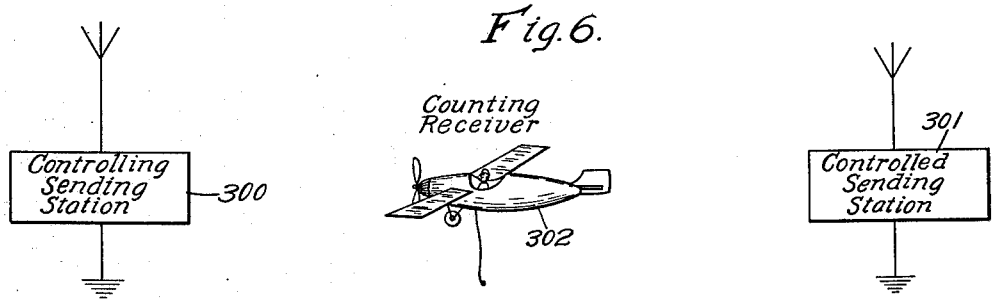
Fig. 6 is a similar diagram for still another embodiment.

In Fig. 6, I have illustrated a sending station 300 and a second sending station 301, both stationary. The station 301 is controlled from the station 300 in the way explained in connection with Figs. 3 and 4. This is similar to the system illustrated in Figs. 1, 2 and 3, but it is intended to indicate that many of the refinements shown in these figures may be omitted. The significant feature is that station 300 and station 301 radiate the same frequency, and that station 302 obtains a beat note from the difference in frequency created by its own movement and the resultant Doppler effect.

The same relation can be stated differently. Stations 300 and 301 establish a system of standing waves in the space through which station 302 travels. Every passage of station 302 through a node of this system will result in a minimum of received signal, and every passage through an anti-node will cause a maximum. Counting either the minima or the maxima will thus be equivalent to counting the half-wave lengths.

If stations 300 and 301 are not of exactly the same frequency, they will produce a beat note at station 302. The motion of station 302 will then give rise to changes in the pitch of the beat note, and the rate of the motion can be judged thereby.

One specific instance of this modification is important. If the difference between the frequency of station 301 and that of station 300 is equal to twice the standard speed of the aeroplane toward the station of lower frequency in wave length per second, progress of the aeroplane at standard speed will be indicated by absence of a beat note.

Stated in terms of waves in space, this modification can be said to produce a system of waves which are not standing but progress slowly. The passage of station 302 across these waves can be counted as in the case of standing waves. In the specific instance just mentioned, the aeroplane travels at the same speed as the system of waves and, consequently, does not pass across them.

The receiving station, particularly when used upon an aeroplane, may also serve as a radio compass. It is, therefore, unnecessary to use a separate receiving set for compass purposes.

When the receiving apparatus includes two sets of three loops each, as explained in connection with Figs. 1 and 2, the common axis of the three loops must be directed toward the sending station to obtain the strongest reception. In this way, the antenna system of three loops can be made to serve as a radio compass. In the simple form illustrated in Fig. 6, a single loop may replace the two triple loops illustrated in Fig. 1, and the mono-cyclic squares may be omitted at stations 300 and 301.

If, however, the sending stations are arranged to deliver circularly polarized radiation, a single loop upon station 302 may be rotated about a horizontal axis to that position in which reception is best, and this position will slowly change as the station moves. This rotation of the receiving loop may be effected either manually or automatically, and, by counting the number of rotations, the progress of the aeroplane may be measured.

Many other variations of my invention will occur to those skilled in the art, and many other systems can be described which would involve it. The specific mention of a few of these systems and the detailed illustration and description of one are not to be construed as limitations. No limitation is intended except as required by the prior art and expressed in the claims.

I claim as my invention:

1. In a radio system, two sending stations each comprising means for transmitting a carrier wave modulated at a fixed frequency, a receiving station located in the common field of said sending stations, said receiving station comprising means for separately demodulating said carrier waves and means for combining the products of demodulation to produce beats having a frequency dependent upon relative movement between said receiving station and at least one of said sending stations.

2. In a radio system, two sending stations each comprising means for transmitting a carrier wave modulated at a fixed frequency, a receiving station movable with respect to said sending stations and located in their common field, said receiving station comprising means for separately demodulating said carrier waves and means for combining the products of demodulation to produce beats having a frequency dependent upon the movement of said receiving station.

3. In a radio system, a sending station comprising means for transmitting a carrier wave modulated at a certain frequency, a second sending station comprising means for transmitting a second carrier wave having a different wave length than said first carrier wave and modulated at said certain frequency, a receiving station movable with respect to said sending stations, said receiving station comprising means for demodulating said first carrier wave, means for demodulating said second carrier wave, means for impressing the products of said demodulations upon a translating device whereby beats are obtained when said receiving station is in motion, and means for indicating said beats.

4. In a distance-indicating system for moving vehicles, a means for radiating circularly-polarized electromagnetic radiation located at each of two separate points close enough together to cover effectively a common field-area, and means for imparting to said respective radiations periodic variations which differ from each other in frequency by a fraction substantially less than the ratio of twice the maximum operating speed of said vehicle to the speed of light.

5. In a position-indicating system, means for radiating a circularly-polarized electromagnetic radiation located at each of two separate points, means for imparting to said respective radiations the same periodic modulating frequency, and two separate receiver-devices positioned at a third point, said devices being of a type adapted to produce an output current varying in accordance with said modulations, said receiver-devices being of a type in which the volume is maintained at a substantially constant level under control of variations in amplitude of the received signal, and the output currents of said receiving devices connected in opposition.

6. In a position-indicating system, a source of electromagnetic radiation at each of two separate points, means to modulate said respective means at substantially the same frequency, and two receiver-devices positioned at a third point, said devices being adapted to produce output currents varying in accordance with said modulation, said receiver-devices being of a type in which the volume is maintained at a substantially constant level under control of variations in amplitude of the received signal, and the output currents of said receiving devices connected in opposition.

LEWIS W. CHUBB.